UNITED STATES PATENT OFFICE.

FRITZ ACH, OF MANNHEIM, ASSIGNOR TO C. F. BOEHRINGER & SOEHNE, OF WALDHOF, NEAR MANNHEIM, GERMANY.

EUGENOL BENZYL-ETHER AND PROCESS OF PREPARING SAME.

SPECIFICATION forming part of Letters Patent No. 487,167, dated November 29, 1892.

Application filed July 5, 1892. Serial No. 439,029. (No specimens.)

*To all whom it may concern:*

Be it known that I, FRITZ ACH, a citizen of the German Empire, residing at Mannheim, in the Grand Duchy of Baden and German Empire, have invented a certain new and useful Process of Preparing Eugenol Benzyl-Ether; and I do hereby declare the following to be a full, clear, and exact description of the invention, such as will enable others skilled in the art to which it appertains to make and use the same.

My invention relates to the preparation of a new compound used in the preparation of vanillin, and which I term "eugenol benzyl-ether," from eugenol; and for this purpose my invention consists in the method, steps, and features described in the specification, and covered in the claims annexed.

My invention is preferably carried out as follows: One kilogram of eugenol is dissolved in three kilos rectified spirits, and to this are added, first, three hundred and fifty grams caustic potash dissolved in a small quantity of water, and, secondly, eight hundred grams of benzyl chloride, (or corresponding molecular quantities of benzyl iodide or bromide,) and the whole is heated on the water bath with a reflux cooler. The greater portion of the spirits is distilled off, and by the addition of water eugenol benzyl-ether, which separates as a heavy oil, is precipitated. For separating any eugenol that may not have been converted the oil is shaken up with dilute alkali, and the eugenol benzyl-ether thus purified is then distilled in a partial vacuum. The eugenol benzyl-ether thus obtained is a colorless oil which solidifies in thick prisms, having a melting-point of 29° to 30° centigrade. Its formula is:

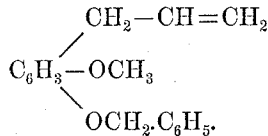

While I consider the above the preferable manner of carrying out my invention, I desire it to be understood that the process thus set forth may be modified in many particulars without departing from the essence of my invention. Thus, for example, as already stated, instead of the benzyl chloride employed I may employ other halogen compounds of benzyl, as benzyl iodide or bromide, and instead of the caustic potash employed I may sometimes use other alkali hydrates. I do not, therefore, desire to be limited to the exact details and steps hereinbefore set forth; but

What I claim, and desire to secure by Letters Patent, is—

1. The process which consists in dissolving eugenol in rectified spirits, adding thereto alkali hydrate and a halogen compound of benzyl, and heating the mixture, substantially as set forth.

2. The process which consists in dissolving eugenol in rectified spirits, adding thereto caustic potash and benzyl chloride, and then heating the mixture, substantially as set forth.

3. The process which consists in dissolving eugenol in rectified spirits, adding thereto alkaline hydrates and a halogen compound of benzyl, heating the mixture, and then distilling off the spirits and adding water to precipitate eugenol benzyl-ether, substantially as set forth.

4. The process of purifying eugenol benzyl-ether, which consists in shaking the same up with dilute alkali and subsequently distilling the same in a partial vacuum, substantially as set forth.

5. The process which consists in dissolving eugenol in rectified spirits, adding thereto alkaline hydrates and a halogen compound of benzyl, heating the mixture, and then distilling off the spirits and adding water to precipitate eugenol benzyl-ether, and finally purifying the eugenol benzyl-ether, substantially as set forth.

6. As a new compound, eugenol benzyl-ether, consisting in a colorless oil, having the formula hereinbefore stated, and which solidifies in thick prisms having a melting-point of 29° to 30° centigrade, substantially as set forth.

In testimony whereof I affix my signature in presence of two witnesses.

FRITZ ACH.

Witnesses:
OTTO AKERMANN,
FERD. BOPP.